Patented Sept. 2, 1930

1,775,037

UNITED STATES PATENT OFFICE

AUGUSTUS H. FISKE, OF PROVIDENCE, RHODE ISLAND, ASSIGNOR TO RUMFORD CHEMICAL WORKS, OF PROVIDENCE, RHODE ISLAND, A CORPORATION OF RHODE ISLAND

BAKING POWDER

No Drawing.   Application filed March 2, 1928.   Serial No. 258,693.

My present invention relates to what might be called an improvement in baking powders or a new or modified baking powder for the making of pastry, biscuits and like batter products as distinguished from those made from yeast raised dough.

These two types of oven products, although both produced by baking involve such different factors and such different processes of manufacture that they have been considered to be and really are essentially different propositions as a matter of cookery. They require totally different methods of treatment so much so that there seems to be little in common between them, except for the flour as an ingredient common to the two. Even the flour used in these two processes is essentially different, as the high gluten, hard wheat flours are especially desirable for making yeast bread dough, while it is not possible to make a commercially satisfactory loaf of yeast raised bread from the soft wheat flours. The latter are those chiefly used in connection with baking powder leavening. As has been long recognized, it is not possible to make cake from a yeast raised dough, nor has it been possible to make a satisfactory and merchantable bread considered as loaves, from a baking powder raised batter. For example, taking as a basis of comparison so-called Parker House rolls and so-called baking powder biscuits as the most comparable forms of these two types of oven product, it is obvious that both mechanically and as a matter of dietetics the two products even though made from the same flour are entirely different and distinct.

While the art of making baking powders, and while their use in making the various food products has become very highly developed, there has been seen no possibility of developing in this field certain factors of improvement that have been long recognized as desirable in yeast raised bread making.

It was recognized at a very early date that certain oxygen supplying materials, such as peroxides and other compounds containing loosely held oxygen, produced distinguishable improvements in yeast raised dough and the bread baked therefrom. Jago in his treatise on bread making has pointed out the improvements previously made and himself contributed certain improvements in the making of bread from yeast raised dough and in this art has been followed by many investigators who have listed large numbers of compounds which could be used under the conditions existing in the development of a yeast raised dough batch to produce improvements in the ultimate loaf and economy in its manufacture.

Throughout this time it has been apparently believed that none of these improvements could be carried over into the baking powder raised batter in which the conditions were inherently different according to all established practice.

I have discovered that it is possible to utilize in the making of products from baking powder raised batter many of the compounds heretofore proposed as advantageous in the yeast raised dough. I have found that there are certain controllable conditions in the production of baking powder and in its use in making a raised batter by means of which many of these previously mentioned compounds can be made to produce the same or very similar desirable results as in the yeast raised batch.

Without enumerating all of the ingredients capable of such use, I will proceed to explain what I believe to be the controlling principles and to illustrate by specific formulæ those which I have found most advantageous and best adapted to what might be called the baking powder principle as long recognized in this art.

One of the obvious difficulties in producing such a material change in the body of the flour itself, as that of the development of the gluten in a baking powder raised product, is the factor of time, as one of the prime purposes of baking powder as distinguished from yeast was its capacity of producing a bakeable batter immediately upon the mixing of the batter. In other words, baking powder usage has presupposed an immediate baking upon the mixing of the batter and in its generations of use this desire and purpose has been a factor of very considerable control where both yeast and baking powder were both available.

In such a short time as elapsed between the mixing of the batter and the baking of the biscuit or other product, there was no opportunity for such development and change as took place in the yeast raised dough batch with its periods of raising and manipulation and careful temperature control. The introduction of such a factor into the making of baking powder products seemed therefore impossible and even upon my first conception of a baking powder product which would combine factors of gluten development and batter improvement I found that the compounds entirely effective in the yeast raised dough batch were so impotent as to be practically useless in the making of baking powder products. My further study of this problem led me to a solution which seems to be based on the following theory which although novel is not inconsistent with previous knowledge.

Of the several successful types of baking powder variously represented by those placed on the market in sufficient commercial quantities to form a basis of observation or record, it will be noted that these baking powders have been compounded so as to produce a neutral or slightly alkaline residue. This, while entirely desirable from the view point of the generated gas, constituted what I believe is an obstacle to the successful development of the flour ingredients in a baking powder raised batter.

I have demonstrated that by so balancing the acid and alkaline reactants of the baking powder as to produce a slightly acidic residue, I create in the baking powder batter a medium favorable to the activation of many, if not most of the compounds previously found useful in yeast raised doughs. I have found certain other factors desirable and capable of use without any undesirable results in yeast raised batters, notably as to the amount of certain of these compounds which can be used in a baking powder batter and which were supposedly useable within only narrow limits in the yeast raised dough.

For example, I am able to produce what we might call a modified baking powder or a new product having the baking powder function useable to all intents and purposes in the same way that ordinary baking powder is used. For example, I produce such a baking powder product using by way of illustration a baking powder employing as its acid ingredient an acid phosphate of calcium. According to the standards of the Bureau of Chemistry it is necessary for a baking powder to have 12% available carbon dioxide gas for leavening purposes. On this basis I may make my formula for baking powder in the way well known to those versed in the art and in addition incorporate an excess of the acid ingredient above what is ordinarily used for such a type of baking powder, in order that the batter produced may have an acidic reaction which I find is highly important if not essential to the effective rate of liberation of the oxidizing property. In other words, this acidic condition seems to lend to a more activation of the loosely held oxygen in the gluten developing ingredient.

In regard to the other well known forms of baking powder such as use as their acid ingredient cream of tartar and/or tartaric acid, and those which employ the salts of alumina and/or without acid phosphate, my method of modifying the baking powder would be similar. There are other proposed baking powders depending on other acid ingredients or combinations, and in each case I would increase the acid ingredient beyond the well known and usual limit of the art so as to produce a batter containing a slightly acid condition.

Suppose for example, referring back to the acid calcum phosphate baking powders mentioned above, I would use 28.5 lbs. of bicarbonate of soda, 35.75 lbs. of acid calcium phosphate, 25.75 lbs. of starch, but under my modification of the above formula I would use 28.5 lbs. of bi-carbonate of soda, 41.5 lbs. of acid calcium phosphate, 30¼ lbs. of starch and 2 lbs. of peroxide of calcium.

In place of the calcium peroxide any other peroxide or compound containing loosely combined oxygen might be used according to my invention, if it fulfilled the necessary conditions existent in the well balanced generation of the gas in the baking powder and which gave the same equivalent oxidizing power as the calcium peroxide as stated above according to known standards. In place of peroxide I may use persulphates or perborates or other compounds with oxidizing properties whether organic or inorganic. It has been my custom to standardize such elements on the basis of equivalent hydrogen perdoxide calculated from the analysis of the available oxygen in the material and I find that approximately 0.6% equivalent hydrogen peroxide gives excellent results under the conditions of the use of the baking powder. I do not confine myself absolutely to this amount as it is possible that slightly more or slightly less would give somewhat similar results in the batter.

It is well known that peroxides vary in strength in accordance with the available equivalent hydrogen peroxide and it is therefore necessary to vary the calcium peroxide in proportion to its strength of equivalent hydrogen peroxide in order to get the proper result in the baking powder. There is another factor which we must bear in mind and this is the possible neutralizing factor of the peroxide used. If the peroxide is of a basic nature it will be necessary to allow additional acidity to take care of this additional base. This additional acidity must be calculated to be in addition to the amount necessary to make the dough sufficiently acid in nature.

It is well known also that the acid phosphate of calcium or any acid ingredient which may be used for the manufacture of baking powder will vary in its acidic strength depending on the factors employed in its manufacture and if an acidic material is used the acidity must be calculated sufficient to take care of the base if any left over from the reactants of the baking powder, it must also take care of any base resulting from the gluten developing oxidizing material and it must as well allow for sufficient acidity in the dough. It has been my experience that approximately 1% of acid is sufficient for the acidity and calculated in terms of bi-carbonate of soda neutralizing strength which is the usual method of measuring acidity for those skilled in the art.

If we calculate the amount of baking powder used per pound of flour and from this calculate the amount of equivalent hydrogen peroxide used in proportion to the flour and then if we compare this with the usual amount of equivalent hydrogen peroxide used with the flour in making yeast raised doughs according to the usual procedure, I find that the amount in proportion to the flour in the baking powder batter in accordance with my invention is about ten times the amount used in yeast raised dough. I further have found that at least three or four times as much equivalent hydrogen peroxide in proportion to the flour is necessary in the baking powder over that necessary in the yeast dough to get proper gluten development and that the best results are obtained with the use of about ten times as much as a maximum. This is shown in my formula as above.

The activity of the sample of calcium peroxide is an important factor in the exact balancing of the formula, as the strongest samples require lesser amounts of material to be added to the baking powder in proportion to their strength to give the equivalent result.

In the practice of my invention it is only necessary to carry forward the observation of the properties of the various ingredients selected as in preparing the formula and maintaining the standard of any baking powder. It is only necessary that what we may call its third dimension should be proportioned to the other two factors heretofore employed so that the ultimate proportion should have the full effective strength in each but in reaction be upon the acid side.

All such formulæ are computable by one skilled in the art if the principles of my invention as set forth above are followed, and the varieties of ingredients and proportions are so many that I have not attempted to multiply formulæ herein. All such are within the concept of my invention.

What I therefore claim and desire to secure by Letters Patent is:

1. A baking powder including acid and carbonate reactants, and a basic inorganic peroxide productive of nascent oxygen by reaction with the acid, the acid being in neutralizing relation to the combined basic radicals of the other two reactants to leave the residue in usual neutrality.

2. A baking powder including three reactants, one an acid, one a carbonate, and a calcium peroxide containing oxygen yieldable as a nascent gas by reaction with the acid, the acid being in neutralizing relation to the combined basic radicals of the other two reactants to leave the residue in usual neutrality.

In testimony whereof I affix my signature.

AUGUSTUS H. FISKE.